(12) United States Patent
Eibling et al.

(10) Patent No.: US 7,085,580 B1
(45) Date of Patent: Aug. 1, 2006

(54) AGGREGATE POWER MEASUREMENT

(75) Inventors: Edward Ellis Eibling, Convent Station, NJ (US); Kyung Hwan Ko, Basking Ridge, NJ (US); Lily Zhu, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1119 days.

(21) Appl. No.: 09/385,725

(22) Filed: Aug. 30, 1999

(51) Int. Cl.
*H04Q 7/20* (2006.01)

(52) U.S. Cl. .................. 455/522; 455/13.4; 455/127.1; 455/115.1

(58) Field of Classification Search ................ 455/522, 455/69, 126, 102–103, 53.1, 54.1, 56.1, 13.4, 455/127, 115, 13.1, 436, 438, 67.4, 437, 442, 455/127.1, 9, 11.1, 115.1, 115.4, 67.11, 67.13, 455/67.16, 68, 134–136; 370/320, 335, 342
See application file for complete search history.

(56) References Cited

U.S. PATENT DOCUMENTS

| | | | |
|---|---|---|---|
| 5,715,526 A * | 2/1998 | Weaver, Jr. et al. | 455/126 |
| 5,842,114 A | 11/1998 | Ozluturk | |
| 5,893,035 A * | 4/1999 | Chen | 455/522 |
| 5,937,353 A * | 8/1999 | Fapojuwo | 455/444 |
| 6,038,220 A * | 3/2000 | Kang et al. | 370/252 |
| 6,058,107 A * | 5/2000 | Love et al. | 370/332 |
| 6,151,508 A * | 11/2000 | Kim et al. | 455/522 |
| 6,160,999 A * | 12/2000 | Chheda et al. | 455/69 |
| 6,259,927 B1 * | 7/2001 | Butovitsch et al. | 455/522 |

FOREIGN PATENT DOCUMENTS

| | | |
|---|---|---|
| CA | 2237895 | 5/1997 |
| EP | 805568 A1 * | 5/1997 |
| WO | WO 98/24198 | 6/1998 |

* cited by examiner

*Primary Examiner*—Pablo N. Tran

(57) ABSTRACT

The power level of at least one forward-link signal is determined for a measurement interval, where the measurement interval has a duration smaller than or equal to the time period in which at least one power-indicative signal characteristic can change. For example, a power-indicative signal characteristic used can be the information rate of the signal, which can change once per frame. In this case the measurement interval would be smaller than or equal to a frame. Preferably, the measurement interval is smaller than the time period in which any of the power-indicative signal characteristics can change. The power level of the signal is based on the signal's power-indicative signal characteristics during the measurement interval. In one embodiment of the invention, the signal's power-indicative signal characteristics include the information rate, and the gain of the signal. The power-indicative signal characteristics can also include whether the information contained in a traffic signal is control information or voice and/or data information, whether the signal is setting up a call or is part of an established call, and whether the call is in a soft handoff. Each forward-link signal is a part of a signal set. The signal set can include: all or some of the signals corresponding to a sector of the cell containing the base station; or all or some of the signals amplified by the base station's amplifier. The power level of each signal that is in the signal set is summed to obtain the power level of the signal set.

22 Claims, 4 Drawing Sheets

AGGREGATE POWER MEASUREMENT

BACKGROUND OF THE INVENTION

1. Field of the Invention

The present invention relates generally to wireless communication systems and, in particular, to power measurement in wireless communication systems.

2. Description of the Related Art

Wireless communication systems employ Code Division Multiple Access ("CDMA") modulation techniques to permit a large number of system users to communicate with one another. The ability of such systems to work is based on the fact that each signal is coded with spreading sequences, such as pseudo-random noise ("PN") sequences, and orthogonal spreading sequences such as Walsh codes. This coding permits signal separation and signal reconstruction at the receiver. In typical CDMA systems, communication is achieved by using a different spreading sequence for each channel. This results in a plurality of transmitted signals sharing the same bandwidth. Particular transmitted signals are retrieved from the communication channel by despreading a signal from all of the signals by using a known user despreading sequence related to the spreading sequence implemented at the transmitter.

FIG. 1 illustrates CDMA system 100. The geographic area serviced by CDMA system 100 is divided into a plurality of spatially distinct areas called "cells." Although cells 102, 104, 106 are illustrated as a hexagon in a honeycomb pattern, each cell is actually of an irregular shape that depends on the topography of the terrain surrounding the cell. Each cell 102, 104, 106 contains one base station 112, 114, and 116, respectively. Each base station 112, 114, and 116 includes equipment to communicate with Mobile Switching Center ("MSC") 118, which is connected to local and/or long-distance transmission network 120, such as a public switch telephone network (PSTN). Each base station 112, 114, and 116 also includes radios and antennas that the base station uses to communicate with mobile terminals 122, 124.

When a call is set up in a CDMA system, a base station and mobile terminal communicate over a forward link and a reverse link. The forward link includes communication channels for transmitting signals from the base station to the mobile terminal, and the reverse link includes communication channels for transmitting signals from the mobile terminal to the base station. The base station transmits certain types of control information to the mobile terminal over a communication channel, referred to herein as a forward-link control channel, also known in the art as a forward overhead channel. Forward-link control channels include the pilot, paging, and synchronization channels. The base station transmits voice or data, and certain types of control information over a communication channel, referred to herein as a forward-link traffic channel. The signals on the communication channels are organized in time periods, referred to herein as frames. Frames are typically 20-millisecond (ms) in length. The signals transmitted over the control channels are referred to herein as control signals, and the signals transmitted over the traffic channels are referred to herein as traffic signals.

FIG. 2 shows a portion of base station 112. Base station 112 includes master controller 130, channel units 140 and 142, radio unit 150 that includes a baseband transmit and receive section, and an RF section. Base station 112 also includes amplifier 160, peripheral hardware 170, and antenna 180. Although only two channel units are shown, the base station can include either more or less channel units.

Each channel unit 140 and 142 includes channel unit controllers 196 and 198, respectively, and multiple channel elements 184, 186, 188 and 190, 192, 194, respectively. A channel element is required for each call being handled by the base station. The channel elements encode the data in a signal with the spreading codes. Each signal transmitted by base station 112 is the output of one of the channel elements. The outputs of the channel elements are digitally combined to form a combined-baseband signal. The combined-baseband signal is then provided as an input into the radio unit 150 where the signal is slightly amplified and is modulated onto a carrier signal. The modulated signal is amplified by amplifier 160, and then transmitted via antenna 180 to mobile terminal 122.

One of the resource management problems that base station 112 must consider is how to manage forward link power. Base station 112 must determine how much power is being transmitted, such that the maximum power output of the base station amplifiers is not exceeded when additional power is requested.

Base station 112 may implement two forms of power control: individual power control for each traffic signal, which is implemented by most base stations, and overload power control, which is implemented by only some base stations.

In the case of the individual power control, base station 112 determines the power level of the forward link signals to each mobile terminal independent of the power levels of the forward-link signals of the other mobile terminals communicating with the base station. Each mobile terminal receives the transmitted signal and obtains the forward-link signal intended for that mobile terminal. When mobile terminal 122 receives a traffic signal, in CDMA systems that comply to the IS-95 standard, mobile terminal 122 checks to determine whether the received forward-link traffic frame is in error. In a subsequent reverse-link traffic frame that mobile terminal 122 transmits, mobile terminal 122 indicates to base station 112 whether there was an error. In CDMA 2000 systems, mobile terminal 122 checks to determine whether the received forward-link traffic signal has sufficient signal strength to overcome the noise in the system, typically by checking the forward-link traffic signal's signal-to-noise ratio. Mobile terminal 122 then indicates to base station 112 whether the forward-link traffic signal strength is sufficient.

Upon receiving from mobile terminal 122 the information of whether there was an error (in IS-95 compliant CDMA systems) or whether the forward-link traffic signal strength is sufficient (in CDMA 2000 systems) base station 112 determines whether its forward link to this mobile terminal is in fading. Base station 112 then adjusts the power level of this signal accordingly. For example, if base station 112 receives one or more successive indications that there is an erred forward-link traffic frame, base station 112 may determine that this forward-link traffic channel is in fading and increase the power level of this signal.

A goal of overload power control is to ensure that the total power transmitted by base station 112 does not exceed the power level at which the base station's equipment is designed to operate over an extended time period. Overload power control is beneficial when the number of signals that can be transmitted simultaneously by the base station is limited by the total power of all the transmitted signals. The total power of all the transmitted signals is a limiting factor for the number of signals that can be transmitted simultaneously because there is maximum output power level at which the amplifier 160 is designed to operate over an extended time period. This maximum output power is referred to herein as the amplifier's maximum continuous power level. When the power level reaches the amplifier's maximum continuous power level an overload condition exists. The base station should determine how much total power is being transmitted, such that the amplifier's maximum continuous power level is not exceeded for a significant time period when additional power is requested.

Conventional CDMA systems that have some form of overload power control may still not be able to solve the problem of reaching an overload condition. The overload power control may fail to prevent base station 112 from reaching an overload condition due to the rapid variations in the power demand of individual traffic channels and the relatively slow feedback used to provide overload power control. Master controller 130 typically obtains the total power level of the signals amplified by amplifier 160 to determine if there is an overload condition.

Master controller 130 obtains the total power level by obtaining from the channel units 140 and 142 the power level of each signal. Channel units 140 and 142 obtains the power level of each signal using the gain and the information rate of the signal. Each channel unit 140 and 142 receives the gain and the information rate of the signal from each channel element under its control. Channel units 140 and 142 receive the gain and information rate when either: 1) there is change in the gain of the signal corresponding to that channel element; or 2) there has not been a change in the gain for an extended time period, such as 1 second. The information rate is the number of bits of information transmitted per second. Four different information rates are possible: full rate, ½ rate, ¼ rate, and ⅛ rate. The information rate is at the full rate when a large amount of information is being transmitted from the base station to the mobile terminal, and it is at the ⅛ rate when a small amount of information is being transmitted from the base station to the mobile. The ½ and the ¼ rate are transitional rates. On the forward link, when the information rate is ½, ¼, or ⅛, the channel rate, which is the set number of voice or data bits that are transmitted within each frame, is higher than the information rate, and the information is repeated several times per frame. For example, with the ½ rate information is repeated twice each frame; with the ¼ rate the information is repeated four times per frame; and with the ⅛ rate the information is repeated eight times per frame. Repeating the information several times per frame permits the information to be transmitted at a correspondingly lower power.

For each channel element, channel unit controllers 140 and 142 average the information rate over an extended predetermined time period and multiply the averaged information rate by the last reported gain squared to obtain the power level of the signal associated with the channel element. Each channel unit controller 140 and 142 then sends the power level to master controller 130, which sums the power levels of all the channel elements communicating with it to obtain the total power level. Master controller 130 then compares the total power level with the amplifier's maximum continuous power level to determine if there is an overload condition. If master controller 130 determines that there is an overload condition, the base station implements one of several remedies. These remedies typically include: a) denying access to any new call requests, referred to herein as call blocking; b) restricting the transmitted signal to its current level; or c) even clipping the transmitted signal.

Problems arise because, as described above, the channel unit controllers 140 and 142 average the information rate over the extended predetermined time period, typically several seconds, and multiply the averaged information rate by the last reported gain squared. The gain may have changed several times during the extended predetermined time period. Therefore, the power levels obtained by channel unit controllers 140 and 142 may not be the actual power levels of the signals. Master controller 130 uses these power levels to obtain the total power level of the signals, and therefore, this obtained total power level may not be the power level being transmitted by base station 112. However, it is this total power level that master controller 130 compares with the amplifier's maximum continuous power level to determine if there is an overload condition. Therefore, master controller 130 may not be able to accurately determine when there is an overload condition. As a result, conventional base stations can exceed amplifier 160's maximum continuous power level and thereby damage amplifier 160. These drawbacks of conventional base stations have required an over-design of the amplifiers to cope with the overload conditions. Extra margin on the amplifier translates into more expensive and larger systems that still do not guarantee that the base station will perform without overloads.

SUMMARY OF THE INVENTION

The invention solves the above problems by determining the power level of at least one forward-link signal of a base station for a measurement interval, where the measurement interval has a duration smaller than or equal to the time period in which at least one power-indicative signal characteristic can change. For example, a power-indicative signal characteristic can be the information rate of the signal. If the information rate can change once per frame, the measurement interval is smaller than or equal to a frame. Preferably, the measurement interval is smaller than the time period in which any of the power-indicative signal characteristics can change. The measurement interval can be of fixed or of a variable length.

The power level of the signal is based on the signal's power-indicative signal characteristics during the measurement interval. In one embodiment of the invention, the signal's power-indicative signal characteristics include the information rate, and the gain of the signal. The power-indicative signal characteristics can also include whether the information contained in a traffic signal is control information or voice and/or data information, whether the signal is setting up a call or is part of an established call, and whether the call is in a soft handoff.

The forward-link signal is a part of a signal set. The signal set can include: all of the signals corresponding to a sector of the cell containing the base station; or some of the signals corresponding to the sector of the cell; or all of the signals amplified by the base station's amplifier; or some of the signals amplified by the base station's amplifier. For example, the set can include a plurality of the traffic signals, or a plurality of the traffic signals and one or more of the control signals.

A master controller controls a plurality of channel units, each of which control a plurality of channel elements, where each forward-link signal corresponds to one control element. In one embodiment of the invention, each channel unit controller determines the power level of each signal that is both: 1) in the signal set, and 2) correspond to the channel elements controlled by the channel unit. The channel unit controllers then forward the power level to the master controller. The master controller sums the power levels received from the channel units. The master controller forwards this total to every other master controller that controls channel elements that correspond to signals in the signal set. Each master controller sums these totals to obtain the power level of the signal set. In another embodiment of the invention, it is the master controller and not the channel unit controller that determines the power level of each signal. The master controller determines the power level of each signal that is both: 1) in the signal set, and 2) correspond to the channel elements controlled by the master controller.

Determining the power level of at least one forward-link signal of a base station for a measurement interval that has a duration smaller than or equal to the time period in which at least one power-indicative signal characteristic can change allows the base station to more accurately determine the power level of a signal set. This in turn allows the base station to more accurately determine any measurement, such as the pilot fraction, or condition, such as the overload condition, that requires knowledge of the power level of the signal set. For example, this allows the base station to better detect overload conditions, thus protecting the amplifier.

DETAILED DESCRIPTION

Figure 1:
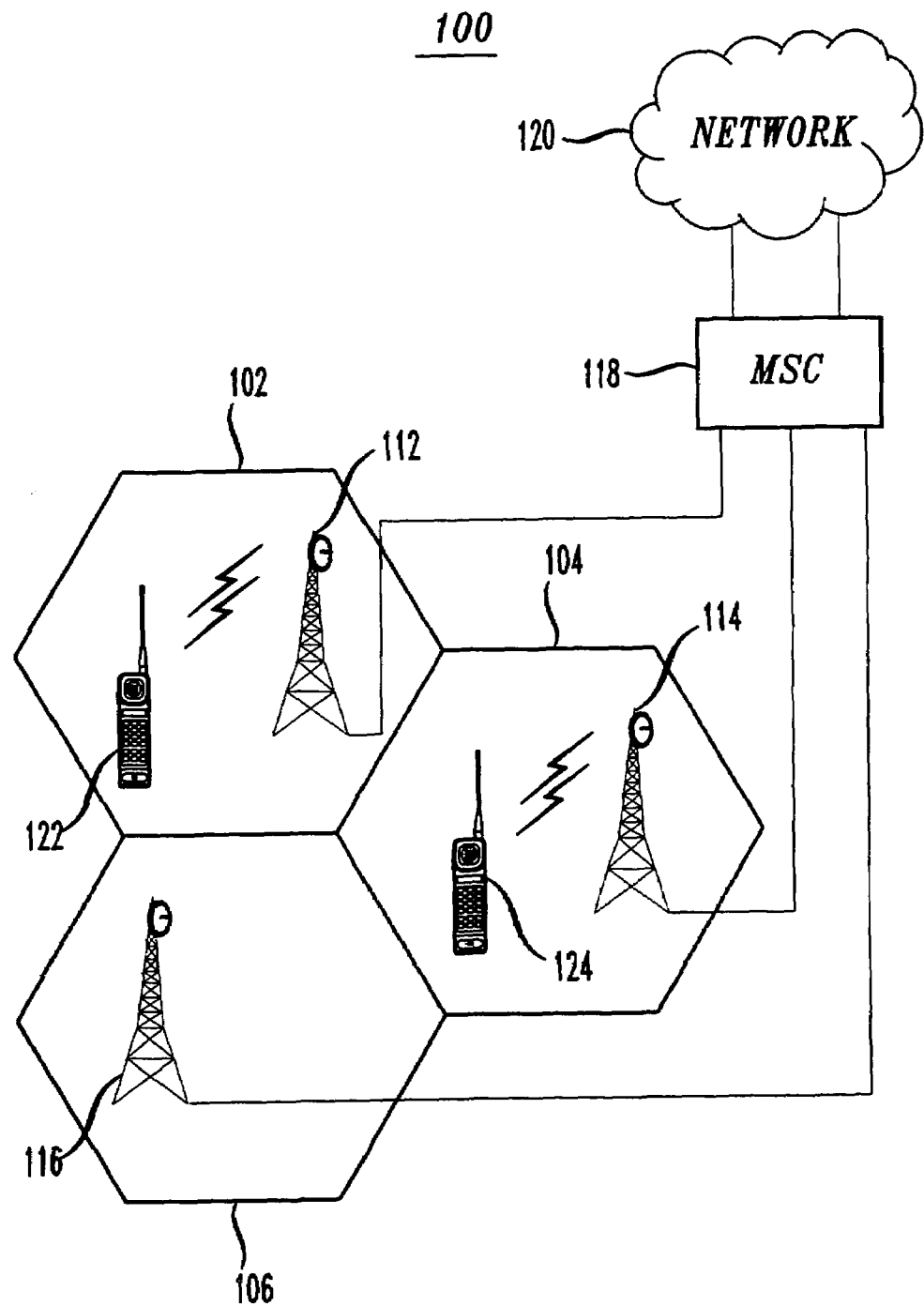
FIG. 1 is a block diagram of a portion of a wireless communication system.
Figure 2:
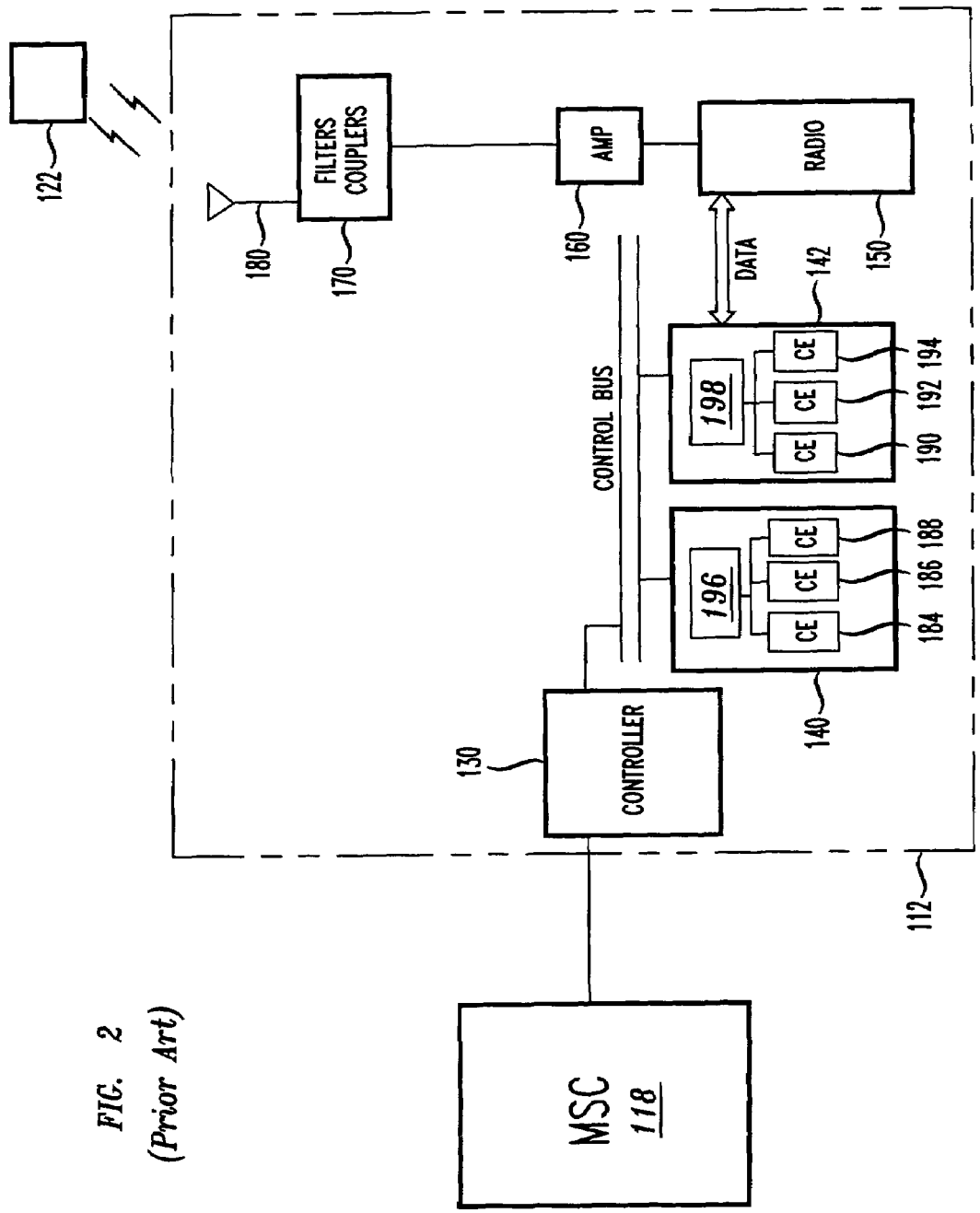
FIG. 2 is a block diagram of the portion of the wireless communication system including a portion of a conventional base station.
Figure 3:
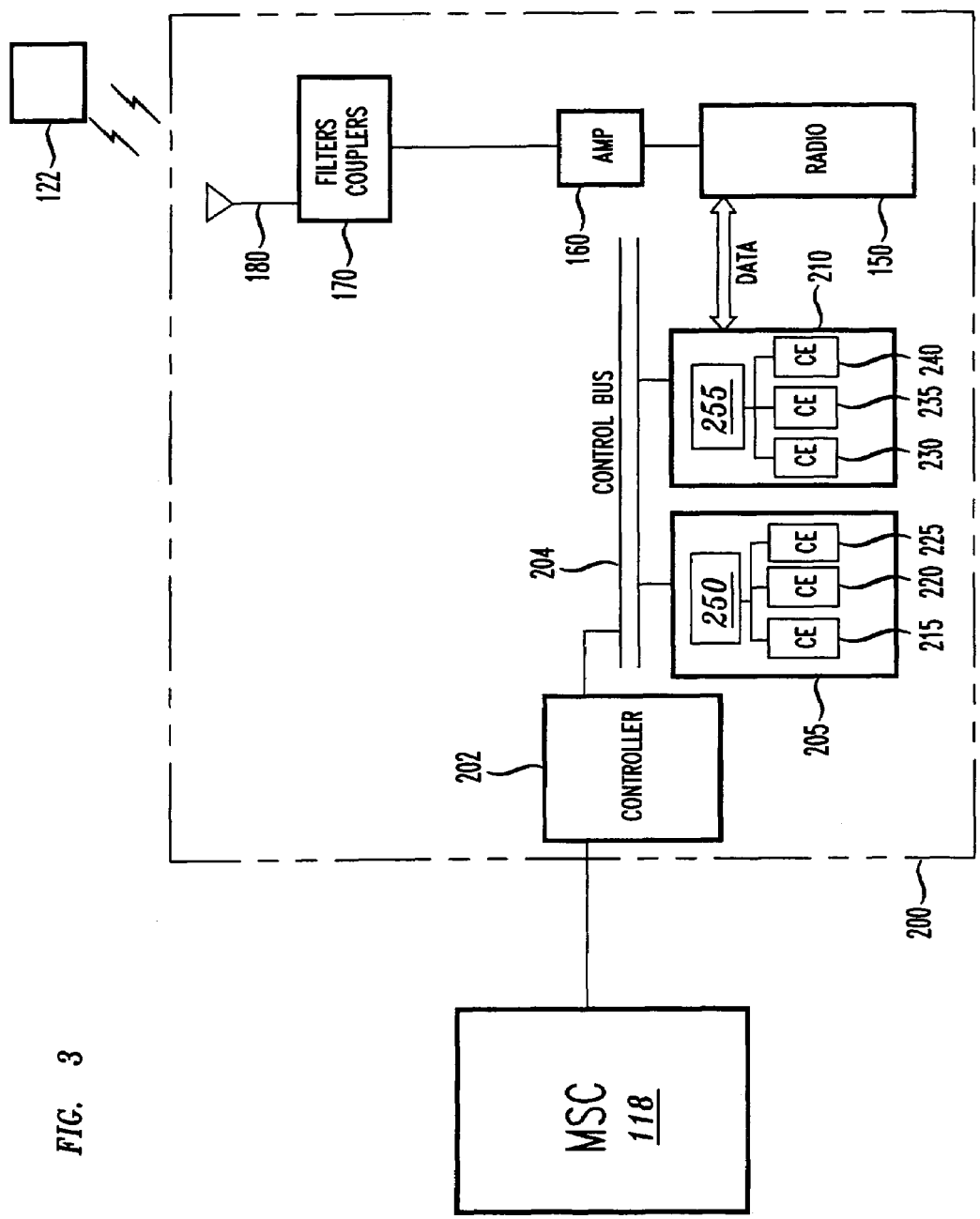
FIG. 3 is a block diagram of the portion of the wireless communication system including of a portion of a base station where channel units and a master controller together obtain the power level of a signal set.

FIG. 3 shows a portion of base station 200 in a CDMA system. Although the embodiment of the invention is being illustrated with the use of a CDMA system, the invention is not limited to use in CDMA systems. The invention may be equally applicable to any wireless communication system, such as Time Division Multiple Access ("TDMA") systems, and Global System for Mobile (GSM) systems, or any other wireless communication system.

Base station 200 includes master controller 202, channel units 205 and 210, radio unit 150 that includes a baseband transmit and receive section, and a RF section. Base station 200 also includes amplifier 160, peripheral hardware 170, and antenna 180. Although only two channel units are shown, the base station can include either more or less channel units.

Master controller 202 is connected to channel units 205 and 210 by control bus 204. Each channel unit 205 and 210 includes channel unit controllers 250 and 255, respectively, and multiple channel elements 215, 220, 225 and 230, 235, 240, respectively. A channel element is required for each call being handled by the base station. The channel elements encode the data in a signal with the spreading codes. Each signal transmitted by base station 200 is the output of one of the channel elements 215, 220, 225, 230, 235, and 240.

Although only three channel elements are shown in each channel unit, each channel unit can include either more or less channel elements. The outputs of the channel elements are digitally combined to form a combined-baseband signal. The combined-baseband signal is then input into the radio unit 150 where the signal is slightly amplified and is modulated onto a carrier signal. The modulated signal is amplified by amplifier 160, and then transmitted via antenna 180 to mobile terminal 122.

When a traffic signal is to be transmitted to mobile terminal 122, the traffic signal is sent from the originating terminal to MSC 118, either via the local and/or long-distance transmission network 120 or via the wireless network. MSC 118 sends the traffic signal to master controller 202, which sends the traffic signal via control bus 204 to the channel unit controller that controls the channel element that will process the signal. For example, when the signal will be processed by channel element 215, master controller 202 sends the signal to channel unit controller 250. Channel unit controller 250 determines most of the signal's power-indicative signal characteristics for a measurement interval and sends the traffic signal to channel element 215. Some of the power-indicative signal characteristics, such as the gain as determined by the signal's individual power control, are set by the channel element. Channel unit controller 250 obtains these power-indicative signal characteristics from channel element 215 at least once every measurement interval. The power-indicative signal characteristics include the information rate of the traffic signal and the gain of the signal. The power-indicative signal characteristics can also include whether the information contained in the signal is control information or voice and/or data information, whether the traffic signal is setting up a call or is in an established call, and whether the call is in a soft handoff. Scaling factors and gains are associated with the power-indicative signal characteristics to be able to adjust the power level of the signal when the power-indicative signal characteristic indicates that certain conditions, as will be explained in more detail below. Channel unit controller 250 uses the gains and the scaling factors to determine the power level P[n] of the traffic signal for the measurement interval. The measurement interval has a duration smaller than or equal to the time period in which at least one power-indicative traffic signal characteristic can change. For example, the information rate of the traffic signal is one of the power-indicative signal characteristics, and the information rate can change once per frame; therefore, the measurement interval can be one frame, or one or several power control groups, where a power control group is $\frac{1}{16}$ of a frame. The measurement interval can be of a fixed length or of a variable length.

In an alternative embodiment of the invention, the measurement interval is smaller then the time period in which any of the power-indicative signal characteristics can change. Typically, on the forward-link the gain is the power-indicative signal characteristic capable of changing fastest. In a CDMA system where the base station obtains power control information once per frame, such as a IS-95A or IS-95B compliant CDMA system, the gain can change once per frame, and therefore the measurement interval would be equal to or less than one frame. In a CDMA system where the base station obtains power control information once every power control group, such as a CDMA 2000 system, the gain can change once per power control group. Therefore, the measurement interval would be equal to or less than one power control group.

As shown in equation 1, the power level P[n] of the traffic signal for the measurement interval is the sum of 1) the power level of the non-power-control symbols multiplied by the non-power-control-symbol fraction and 2) the power level of the power-control symbols multiplied by the power-control-symbol fraction. The non-power-control-symbol fraction is the ratio of the number of non-power-control symbols $N_{os}$ to the number of the total symbols $N_{os}+N_{pcs}$ in the measurement interval. The power-control-symbol fraction is the ratio of the number of power-control symbols $N_{pcs}$ to the number of the total symbols $N_{os}+N_{pcs}$ in the measurement interval, where the power-control symbols $N_{pcs}$ are the symbols used to represent power control bits. Power control bits are the bits that indicate to mobile terminal 122 whether to increase or decrease the power level of its transmitted signal.

$$P[n] = \frac{N_{os}}{N_{os} + N_{pcs}} * K_r * K_x * \min\{MG^2, \max\langle LG^2, (G_s^2 * G^2)\rangle\} + \frac{N_{pcs}}{N_{os} + N_{pcs}} * \min\{MG^2, (G_p^2 * G^2)\} \quad (1)$$

Channel unit controller 250 can obtain the power level of the non-power-control symbols in the following manner. Channel unit controller 250 squares and multiplies the gains, $G_s$ and G that are indicative of the power level of the non-power-control symbols, referred to herein as the non-power-control-symbol gains, to obtain a calculated power level. The non-power-control-symbol gains include the gain $G_s$ based on the information contained in the traffic signal is control information or voice and/or data, and the gain G of the traffic signal as determined by the signal's individual power control. When the information contained in the traffic signal is control information $G_s$ can be any value between 1 and 2, and when the information contained in the traffic signal is voice and/or data $G_s$ is equal to 1. Additionally, when the individual power level of the signal is scaled the scaling gain is also squared and multiplied by $G_s^2 * G^2$ to obtain the calculated power level. For example, the signal can be scaled as part of an overload power control method disclosed in U.S. patent application "Aggregate Overload Power Control", Ser. No. 09/356,816, described in more detail below. When the individual power level of the signal is scaled, the scaling can be performed by multiplying the scaling gain by the gain G as determined by the individual power control, and then squaring the scaled gain and multiplying it by $G_s^2$ to obtain the calculated power level.

This calculated power level $(G_s^2 * G^2)$ is compared with a minimum allowed power level $LG^2$ and with a maximum allowed power level $MG^2$. The max function compares the allowed power level $MG^2$ and selects the smaller of the two values. The minimum allowed power level $LG^2$ is the minimum allowed power level for non-power-control symbols as specified by the standard with which the system containing base station 200 complies. The maximum allowed $MG^2$ power level is the maximum power level at which it is beneficial to transmit a traffic signal on the forward link. Typically, the maximum allowed power level $MG^2$ can be selected to be between 50% and 80% of the power level at which the pilot is transmitted, although it can be between 50% and 100% of the power level at which the pilot is forward link coverage.

When the calculated power level $(G_s^2 * G^2)$ is between the maximum $MG^2$ and minimum $LG^2$ allowed power level, the calculated power level $(G_s^2 * G^2)$ is multiplied by the non-power-control symbol's scaling factors to obtain the power level of the non-power-control symbols. The non-power-control-symbol's scaling factor includes scaling factor $K_r$ based on the information rate of the traffic signal. Additionally, when the signal is scaled based on whether traffic signal is setting up a call or data transmission, or in an established call or data transmission, the non-power-control-symbol's scaling factor includes scaling factor $K_x$. $K_r$ is equal to 1 for a full rate frame, 0.5 for a half rate frame, 0.25 for a quarter rate frame, and 0.125 for an eighth rate frame. $K_x$ is based on the base station's vocoder rate. For an 8 k vocoder $K_x$ is set equal to 1 and does not vary. For a 13 k vocoder, $K_x$ is based on whether the traffic signal is setting up a call or data transmission, or is part of an already established call or data transmission. For example, when the traffic signal is setting up a call, $K_x$ is equal to 1; and when the traffic signal is part of an established call, $K_x$ is equal to 1 for a full rate frame and $K_x$ can range from 1 to 0.25 when the information rate is lower than 1.

When the calculated power level $(G_s^2 * G^2)$ is above the maximum allowed power level $MG^2$, the maximum allowed power level $MG^2$ is multiplied by the non-power-control symbols scaling factors ($K_r$ and $K_x$) to obtain the power level of the non-power-control symbols. When the calculated power level is below the minimum allowed power level $LG^2$, the minimum allowed power level $LG^2$ is multiplied by the non-power-control symbols scaling factors ($K_r$ and $K_x$) to obtain the power level of the non-power-control symbols. Channel unit controller 250 multiplies the power level of the non-power-control symbols by the non-power-control-symbol fraction $$\frac{N_{os}}{N_{os} + N_{pcs}}.$$

Channel unit controller 250 can obtain the power level of the power-control symbols in the following manner. Channel unit controller 250 squares and multiplies the gains $G_p$ and G that are indicative of the power level of the power-control symbols, referred to herein as the power-control-symbol gains, to obtain a calculated power level. The power-control-symbol gains include the gain $G_p$ based on whether the call is in soft handoff, and the gain G of the traffic signal as determined by the signal's individual power control. When the call is not in soft handoff, simplex mode, $G_p$ is equal to 1; when the call is in a two-way soft handoff, $G_p$ is equal to 1.5; and when the call is in a three-way soft handoff or above, $G_p$ is equal to 1.75. Additionally, as described above, when the individual power level of the signal is scaled the scaling gain is also used in obtaining the calculated power level. This calculated power level $(G_p^2 * G^2)$ is then compared with the maximum allowed power level $MG^2$, and the smaller of the two is multiplied by the power-control-symbol fraction $$\frac{N_{pcs}}{N_{os} + N_{pcs}}.$$

Channel unit controller 250 sums 1) the power level of the non-power-control symbols multiplied by the non-power-control-symbol fraction and 2) the power level of the power-control symbols multiplied by the power-control-symbol fraction to obtain the power level P[n] of the measurement interval.

Channel unit controller 250 then forwards the power level P[n] to master controller 202. The channel unit controllers 250 and 255 determine the power level P[n] of each traffic signal that are both in the signal set and that correspond to the channel elements 215, 220, 225 and 230, 235, 240 controlled by that channel unit 250 and 255, respectively. Channel unit controllers 250 and 255 then forward the power level to master controller 202. Master controller 202 sums the power levels of the traffic signals in the signal set sent to it by channel units 250 and 255. When the signal set includes the control signals, master controller 202 also adds the power level of the control signals to the sum of the power level of the traffic signals. The power level of the control signals is typically the gain of the control signals squared since the information rate of the control signal is typically the full rate.

In one embodiment of the invention, master controller 202 then forwards this total to every master controller that controls channel elements that correspond to signals in the signal set. Each master controller may determine this total in the same manner as master controller 202 or they may obtain this total in any other manner. Each master controller sums these totals to obtain the power level PS[n] of the signal set for the measurement interval. The signal set can include: all of the signals corresponding to a sector of the cell containing the base station; or some of the signals corresponding to a sector of the cell; or all of the signals amplified by the base station's amplifier; or some of the signals amplified by the base station's amplifier. For example, the set can include a plurality of the traffic signals, or a plurality of the traffic signals and one or more of the control signals.

In another embodiment of the invention, master controller 202 averages the power level of the signal set over a plurality of measurement intervals. Master controller 202 can use a filter, such as a single pole infinite impulse response (IIR) filter or a finite impulse response (FIR) filter, to average the power level of the signal set. The number of measurement intervals is selected to balance a desire to obtain the power level for a measurement interval as accurately as possible and a desire to have a smoothly varying power level. For example, the number of measurement intervals can be enough to generate a 5 ms to 400 ms averaging period. Master controller 202 then forwards this total to every master controller that controls channel elements that correspond to signals in the signal set. Each master controller sums these totals to obtain the power level PS[n] of the signal set.

Optionally, the power level PS[n] can be adjusted to take into account the fact that the actual path gain of the transmission path may be different from the nominal path gain of the transmission path. To take into this fact into account the power level can be multiplied by the ratio of the actual path gain to the nominal path gain. The path gain of the transmission path is the path gain of the equipment along the transmission path within base station 200. A nominal path gain is determined when the base station is calibrated under nominal conditions. The nominal path gain can be determined in any manner, including by measuring the power level of a signal at the beginning of the transmission path, i.e. at the channel element, and measuring the power level of this signal at the end of the transmission path, i.e. at the antenna. The ratio of the power level at the end of the transmission path to the power level at the beginning of the transmission path is the nominal path gain. The actual path gain is determined under operating conditions. The actual path gain can be determined in any manner, including by measuring the power level of a signal at the beginning of the transmission path, and measuring the power level of this signal at the end of the transmission path. The ratio of the power level at the end of the transmission path to the power level at the beginning of the transmission path is the actual path gain.

Figure 4:
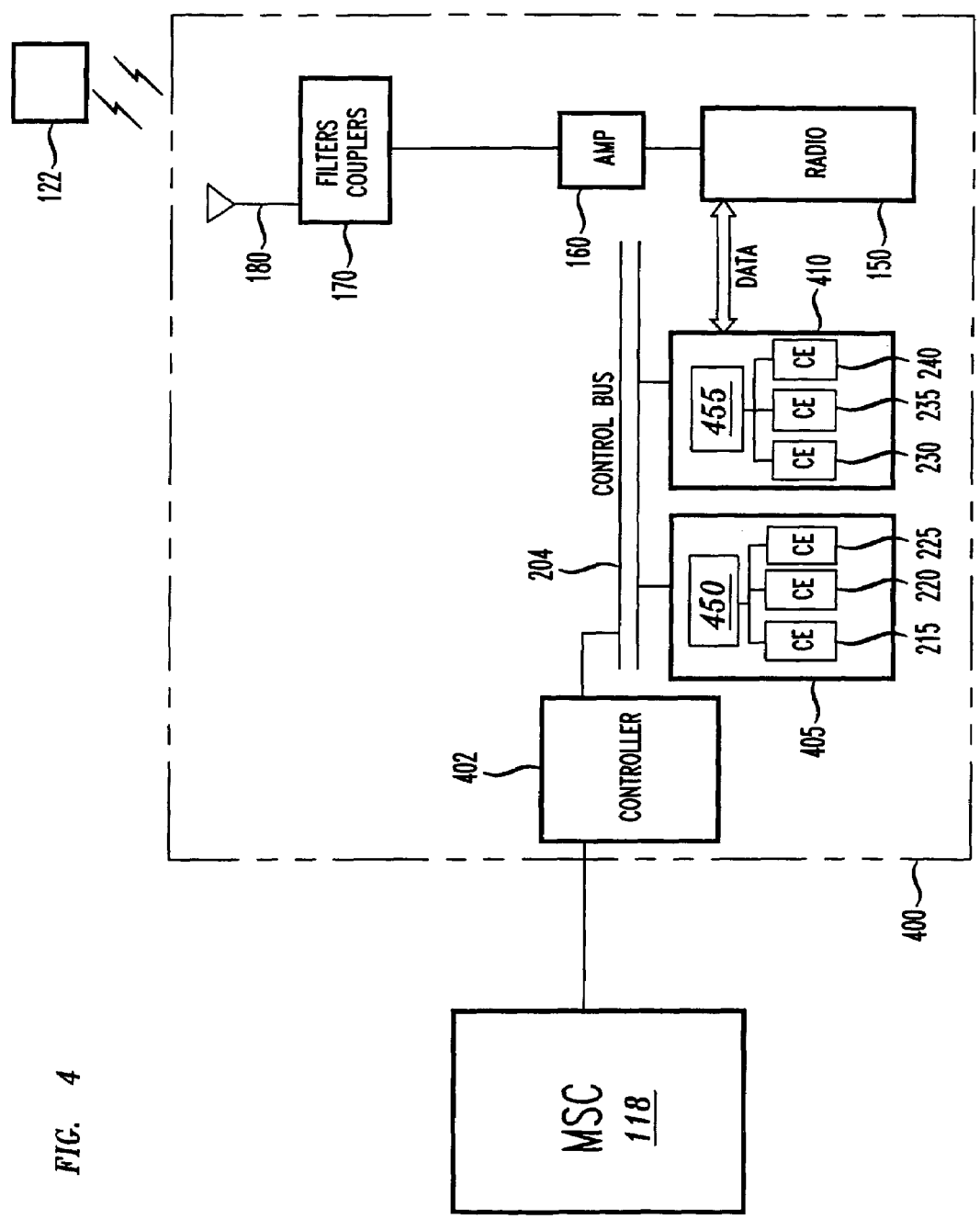
FIG. 4 is a block diagram of the portion of the wireless communication system including of a portion of a base station where the master controller obtains the power level of a signal set.

In another embodiment of the invention, shown in FIG. 4, master controller 402 determines most of the power-indicative signal characteristics for the measurement interval and sends the traffic signal to the channel element. Some of the power-indicative signal characteristics, such as the gain as determined by the signal's individual power control, are set by the channel elements. The channel elements send these power-indicative signal characteristics to master controller 402 at least once every measurement interval. Master controller 402 uses the gains and the scaling factors to determine the power level P[n] of the signal for the measurement interval in the same manner that the channel unit controllers use this information to determine the power level P[n]. Master controller 402 then sums the power level of each traffic signal in the signal set corresponding to the channel elements controlled by the master controller. When the signal set includes the control signals, master controller 402 also adds the power level of the control signals to the sum of the power level of the traffic signals. In this embodiment channel units 405 and 410 may not include channel unit controllers 450 and 455, in which case, master controller 402 controls the channel elements directly.

In one embodiment of the invention, master controller 402 then forwards this total to every master controller that controls channel elements that correspond to signals in the signal set. Each master controller may determine this total in the same manner as master controller 402 or they may obtain this total in any other manner. Each master controller sums these totals to obtain the power level PS [n] of the signal set for the measurement interval.

In another embodiment of the invention, master controller 402 averages the power level of the signal set over a plurality of measurement intervals. The number of measurement intervals is selected to balance a desire to obtain the power level for a measurement interval as accurately as possible and a desire to have a smoothly varying power level. For example, the number of measurement intervals can be enough to generate a 5 ms to 400 ms averaging period. Master controller 402 then forwards this total to every master controller that controls channel elements that correspond to signal in the signal set.

Optionally, the power level PS[n] can be adjusted to take into account the fact that the actual path gain of the transmission path may be different from the nominal path gain of the transmission path. To take into this fact into account the power level PS[n] can be multiplied by the ratio of the actual path gain to the nominal path gain, as described above.

The method for determining the power level of the forward-link signal for a measurement interval can be used with methods of overload control. For example, this method can be used with the overload power control disclosed in U.S. patent application "Aggregate Overload Power Control", Ser. No. 09/356,816, incorporated herein by this reference. This overload power control method changes the power level of a set of forward-link signals responsive to a threshold power level that is based on the amplifier's maximum continuous power level, independent of the individual power control of each of the forward-link signals in the signal set. The power level of the signal set is changed by scaling it by a scaling factor. The total power level of the signal set is obtained during a current time period, and then the scaling factor that will be used in the subsequent time period is determined. The sealing factor is preferably based on the total power level of the signal set for the current time period, a scaling factor used during the current time period, and a threshold power level. The amount by which the total power level exceeds the amplifier's maximum continuous power level is the overload amount. The scaling factor is selected so that for each time period the overload amount is reduced by a percentage or a fixed factor. For example, the overload amount can be reduced by 3% for the current time period, and then the percentage by which the overload amount is reduced in a subsequent time period is based on the scaling factor of the current time period and the overload amount of the subsequent time period.

Additionally, the method for determining the power level the forward-link signal for a measurement interval can be used with initiating call blocking disclosed in U.S. patent application "Overload Control Utilizing Call Blocking", Ser. No. 09/356,825, incorporated herein by this reference. This method initiates call blocking responsive to a call-quality measurement of the forward link. The call-quality measurement is a measurement of bow well a mobile terminal is able to receive the forward link. For example, one call-quality measurement is the power fraction, which can be more accurately obtained using the current invention.

The foregoing is merely illustrative. Thus, for example in the illustrative embodiment there are many power-indicative signal characteristics used to determine the power level of the non-power-control symbols. In an alternative embodiment, only the information rate and the gain as determined by the signal's individual power control, can be used to determine the power level for non-power-control symbols. Additionally, the power level of the power-control symbols can be determined in the same manner as described above, or it can be determined using just the gain as determined by the signal's individual power control.

Furthermore, although in the illustrative embodiment only the power levels of the traffic signals are determined using the power-indicative signal characteristics, in an alternative embodiment the power levels of both the traffic and the control signals can be determined using the power-indicative signal characteristics of the signal.

Moreover, although in the illustrative embodiment the base station includes one amplifier, in alternative embodiments the base station can include a plurality of amplifiers, each for amplifying a signal set. In this case, the power level of the each of the signal sets can be determined using the above process. Additionally, one skilled in the art will recognize that although in the illustrative embodiment each cell is an omni-sector cell, the cell can be divided into a plurality of sectors, with each sector having its own channel elements, radios, amplifiers, and antennas. In this case, the power level of the signal set associated with each sector can be determined using the above process While the invention has been described with reference to a preferred embodiment, it will be understood by those skilled in the art having reference to the specification and drawings that various modifications and alternatives are possible therein without departing from the spirit and scope of the invention.

We claim:

1. A method for determining a power level of a forward-link signal in a wireless system, the method comprising the steps of:
    determining a plurality of power-indicative signal characteristic of the signal; and
    determining the power level of the signal for a measurement interval using the power-indicative signal characteristics, the measurement interval having a duration smaller than or equal to the time period in which at least one power-indicative signal characteristic can change.

2. The method of claim 1, wherein the measurement interval has a duration smaller than or equal to the time period in which any of power-indicative signal characteristics can change.

3. The method of claim 1, wherein the power-indicative signal characteristics comprise an information rate of the signal.

4. The method of claim 1, wherein the power-indicative signal characteristics comprise a gain of the signal as determined by the signal's individual power control.

5. The method of claim 1, wherein the power-indicative signal characteristics comprise whether the information contained in the signal is control information.

6. The method of claim 1, wherein the power-indicative signal characteristics comprise whether the call is in set up.

7. The method of claim 1, wherein the power-indicative signal characteristics comprise whether the call is in soft-handoff.

8. A method for determining a power level of a set of forward-link signals transmitted by a base station in a wireless system, the method comprising the steps of:
    determining a plurality of power-indicative signal characteristics of each of the signals in the signal set;
    determining the power level of each of the signals for a measurement interval using the power-indicative signal characteristics, the measurement interval having a duration smaller than or equal to the time period in which at least one power-indicative signal characteristic can change; and
    determining the power level of the signal set for the measurement interval using the power levels of each of the signals.

9. The method of claim 8, wherein the measurement interval has a duration smaller than or equal to the time period in which any of the power-indicative signal characteristics can change.

10. The method of claim 8, wherein:
    the step of determining the power level of the each of the signals in the signal set comprises, in a channel unit controller:
        obtaining an information rate of a signal and a gain of the signal as determined by the signal's individual power control;
        multiplying the information rate of the signal and the gain squared of the signal to obtain the power level of the signal; and
        forwarding the power level of each signal to a master controller; and
    the step of determining the power level of the signal set comprises summing the power level of each signal in a master controller.

11. The method of claim 8, wherein the step of determining the power level of each of the signals in the signal set comprises, in a master controller:
    obtaining an information rate of a signal and a gain of the signal as determined by the signal's individual power control; and
    multiplying the information rate of the signal and the gain squared of the signal to obtain the power level of the signal.

12. The method of claim 8, wherein the power-indicative signal characteristics comprise an information rate of the signal.

13. The method of claim 8, wherein the power-indicative signal characteristics comprise a gain of the signal as determined by the signal's individual power control.

14. The method of claim 8, wherein the power-indicative signal characteristics comprise whether the information contained in the signal is control information.

15. The method of claim 8, wherein the power-indicative signal characteristics comprise whether the call is in set up.

16. The method of claim 8, wherein the power-indicative signal characteristics comprise whether the call is in soft-handoff.

17. The method of claim 8, wherein the signal set comprises all the signals in a sector of a cell in which the base station is located.

18. The method of claim 8, wherein the signal set comprises all the signals amplified by an amplifier of the base station.

19. The method of claim 8, wherein the signal set comprises a plurality of traffic signals.

20. The method of claim 8, wherein the signal set comprises a plurality of traffic signals and at least one control signal.

21. The method of claim 8, wherein the measurement interval comprises a frame.

22. The method of claim 8, wherein the measurement interval comprises a power control group.

* * * * *